(12) United States Patent
Lau et al.

(10) Patent No.: US 10,638,032 B2
(45) Date of Patent: Apr. 28, 2020

(54) LENS CONTROL APPARATUS CONFIGURED IN AN IMAGING DEVICE

(71) Applicant: AP Photonics Limited, Hong Kong (HK)

(72) Inventors: Herbert Chi-Yuen Lau, Hong Kong (HK); Hang Qing Hong, Hong Kong (HK)

(73) Assignee: AP Photonics Limited, Hong Kong (HK)

( * ) Notice: Subject to any disclaimer, the term of this patent is extended or adjusted under 35 U.S.C. 154(b) by 0 days.

(21) Appl. No.: 15/964,199

(22) Filed: Apr. 27, 2018

(65) Prior Publication Data

US 2018/0316847 A1 Nov. 1, 2018

Related U.S. Application Data

(60) Provisional application No. 62/490,621, filed on Apr. 27, 2017.

(51) Int. Cl.
*H04N 5/232* (2006.01)
*G02B 7/09* (2006.01)
*G02B 27/64* (2006.01)
*H04N 5/225* (2006.01)

(52) U.S. Cl.
CPC .......... *H04N 5/23212* (2013.01); *G02B 7/09* (2013.01); *G02B 27/646* (2013.01); *H04N 5/2253* (2013.01); *H04N 5/23248* (2013.01)

(58) Field of Classification Search
CPC .. H04N 5/2253; H04N 5/2254; H04N 5/2257; H04N 5/23287; G02B 27/64; G02B 27/646; G03B 2205/0007–0038
See application file for complete search history.

(56) References Cited

U.S. PATENT DOCUMENTS

| | | | |
|---|---|---|---|
| 7,725,014 B2 | 5/2010 | Lam et al. | |
| 8,363,150 B2 | 1/2013 | Ming et al. | |
| 9,013,588 B2 | 4/2015 | Moriya et al. | |
| 9,244,253 B2 | 1/2016 | Chen et al. | |
| 2011/0097062 A1* | 4/2011 | Tsuruta | G02B 7/022 396/55 |

(Continued)

FOREIGN PATENT DOCUMENTS

| | | |
|---|---|---|
| CN | 1821825 A | 8/2006 |
| CN | 102955324 A | 3/2013 |

(Continued)

*Primary Examiner* — Paul M Berardesca

(57) ABSTRACT

Embodiments of the present disclosure pertains to a lens control apparatus that can be implemented in an imaging device to provide autofocus (AF) and image stabilization (IS) functionalities. The lens control apparatus includes a casing, a lens carrier movable in said casing and configured to hold an imaging lens, a pair of focusing coils disposed within said casing and configured to enable linear motion of the lens carrier along an optical axis, and a set of actuating coils disposed within said casing and configured to pivot the lens carrier in a first direction relative to the optical axis and a second direction relative to the optical axis, said first direction and said second direction being orthogonal to each other, and wherein the lens control apparatus is capable of providing at least three degrees of freedom to the lens carrier.

18 Claims, 13 Drawing Sheets

(56) References Cited

U.S. PATENT DOCUMENTS

| | | |
|---|---|---|
| 2011/0122495 A1 | 5/2011 | Togashi |
| 2013/0076924 A1* | 3/2013 | Wade .................. G03B 5/02 348/208.11 |
| 2015/0077619 A1 | 3/2015 | Yamano |

FOREIGN PATENT DOCUMENTS

| | | |
|---|---|---|
| CN | 104270555 A | 1/2015 |
| CN | 105492952 A | 4/2016 |

* cited by examiner

LENS CONTROL APPARATUS CONFIGURED IN AN IMAGING DEVICE

PRIORITY CLAIM

This application claims the benefit of priority to U.S. Provisional Patent Application No. 62/490,621 filed Apr. 27, 2017, the contents of which are incorporated herein by reference in their entireties. Where a definition or use of a term in a reference that is incorporated by reference is inconsistent or contrary to the definition of that term provided herein, the definition of that term provided herein is deemed to be controlling.

TECHNICAL FIELD

The present disclosure relates to imaging devices, and more particularly, to a lens control apparatus that provides autofocus (AF) and image stabilization (IS) functionalities in optical imaging devices.

BACKGROUND

With steady rise in use of mobile devices such as smart phones, tablets, etc. there has been a growing need of compact imaging devices such as a camera that can be integrated with the devices. Thus, technology has been on a path to pursue ever higher picture quality in an ever-smaller form factor by including features such as larger lens aperture, lower Z profile, optical image stabilization, and the like. However, techniques implemented to increase lens aperture to admit more light, higher dynamic range, reduction in physical size, etc. translate into increased complexities in design and manufacturing of components of the imaging device.

In recent years, Autofocus (AF) and Image Stabilization (IS) have become prominent features in camera of the mobile devices. AF can bring an image that the user desires to capture into focus and can be accomplished by displacing a lens along an optical axis to control distance between lens and image capturing mechanism. Further, IS enhances picture quality by minimizing blur in the picture that can be caused by any external vibration such as from the hand-shaking while holding a camera. According to a conventional configuration used to implement IS, an actuator performs camera-shake correction by moving a lens according to camera shake detected by a vibration sensor. The lens moving section includes three main members: a base plate fixed to a housing, a first slider that moves in a X-axis direction with respect to the base plate, and a second slider that moves in a Y-axis direction with respect to the base plate. However, the lens moving section of said configuration is bulky and consequently, makes implementation of the configuration in small camera for mobile devices unfeasible.

Therefore, there is a need of an enhanced apparatus for imaging devices that overcome existing and other disadvantages of existing configurations and can provide AF and IS functionalities even for compact devices.

SUMMARY

The present disclosure relates to imaging devices, and more particularly, to a lens control apparatus that provides autofocus (AF) and image stabilization (IS) functionalities in optical imaging devices.

An aspect of the present disclosure pertains to a lens control apparatus. The lens control apparatus includes a casing, a lens carrier movable in said casing and configured to hold an imaging lens, a pair of focusing coils disposed within said casing and configured to enable linear motion of the lens carrier along an optical axis, and a set of actuating coils disposed within said casing and configured to pivot the lens carrier in a first direction relative to the optical axis and a second direction relative to the optical axis, said first direction and said second direction being orthogonal to each other, wherein a pivot point is configured on the optical axis to pivot the lens carrier in the first direction and the second direction about the pivot point, and wherein the lens control apparatus is capable of providing at least three degrees of freedom to the lens carrier.

In an embodiment, the lens control apparatus further includes a pair of magnetic elements having opposite polarities, each magnetic element disposed within the casing on either side of the lens carrier.

In an embodiment, the set of actuating coils include at least two pairs of actuating coils, each actuating coil of a pair of actuating coils mounted on one of diagonally opposite surfaces of the lens carrier.

In an embodiment, each pair of actuating coils is mounted on surface of a focusing coil of the pair of focusing coils, and wherein each focusing coil of the pair of focusing coils is wound concentrically around the lens carrier.

In an embodiment, actuating coils of the pair of actuating coils are electrically coupled with each other and have reverse coil windings with respect to each other.

In an embodiment, focusing coils of the pair of focusing coils are electrically coupled with each other and have reverse coil windings with respect to each other.

In an embodiment, the lens control apparatus further includes a pair of springs, each spring of the pair of springs positioned on either side of the lens carrier and adapted to firmly hold the lens carrier within the casing.

In an embodiment, at least one spring of the pair of springs comprises a plurality of independent spring elements to drive electrical current in any or a combination of the set of actuating coils and the pair of focusing coils.

In an embodiment, configuration of the pivot point on the optical axis is based on ratio of spring constant between each spring of the pair of springs.

In an embodiment, the apparatus is adapted to provide imagery using the imaging lens on a surface of a spherical shaped curved photo-sensor, spherical shape of the curved photo-sensor being symmetrical about the optical axis.

In an embodiment, the pivot point is configured to coincide with radius of curvature of the curved photo-sensor.

In an embodiment, movement of the lens carrier is controlled using a control unit.

In an embodiment, the control unit is operatively coupled with at least one motion sensor.

In an embodiment, the control unit is operatively coupled with at least one position feedback sensor.

Another aspect of the present disclosure pertains to an imaging device that includes a lens control apparatus, wherein said lens control apparatus includes a casing, a lens carrier movable in said casing and configured to hold an imaging lens, a pair of focusing coils disposed within said casing and configured to enable linear motion of the lens carrier along an optical axis, and a set of actuating coils disposed within said casing and configured to pivot the lens carrier in a first direction relative to the optical axis and a second direction relative to the optical axis, said first direction and said second direction being orthogonal to each other, wherein a pivot point is configured on the optical axis to pivot the lens carrier in the first direction and the second direction about the pivot point, and wherein the lens control apparatus is capable of providing at least three degrees of freedom to the lens carrier.

In an embodiment, the imaging device further includes a curved photo-sensor having spherical shape symmetrical about the optical axis.

In an embodiment, the imaging device further includes a control unit configured to control movement of the lens carrier.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE DRAWINGS

Figure 1:
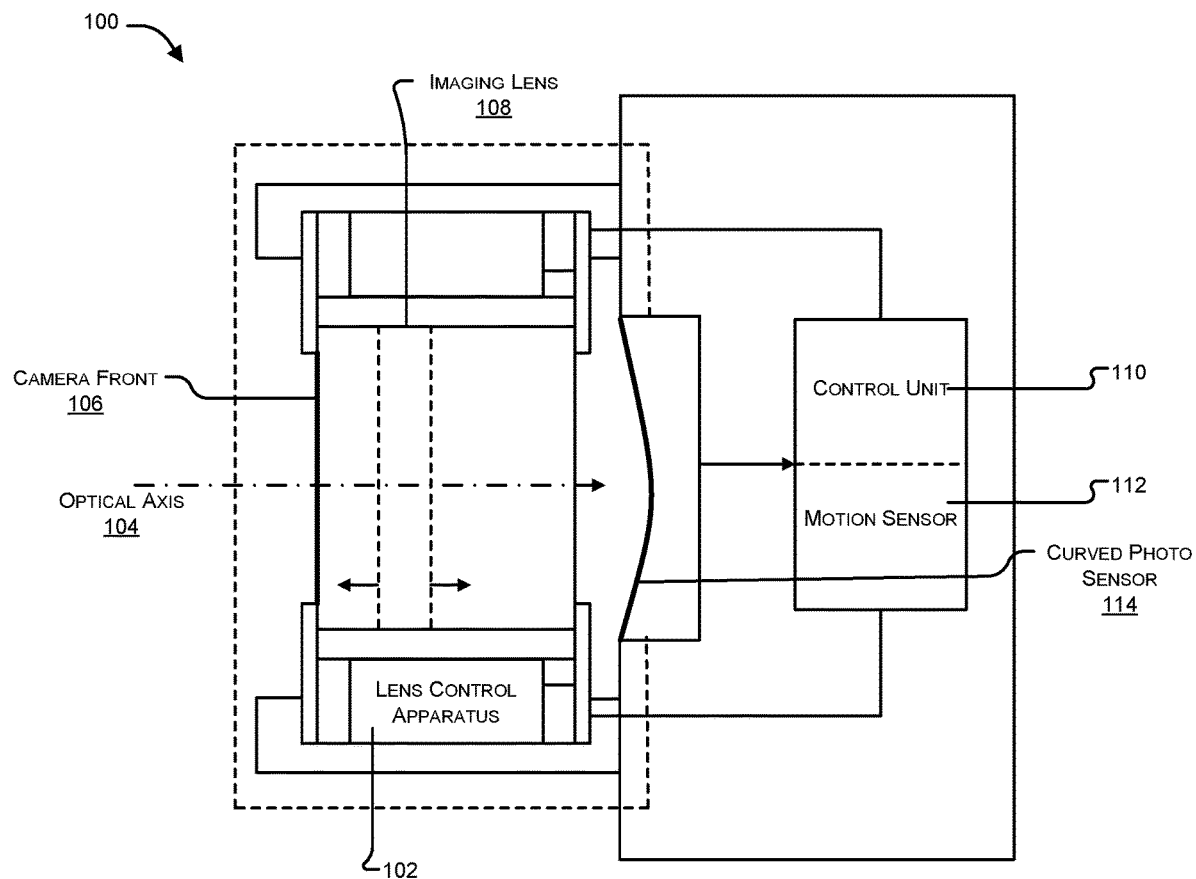
FIG. 1 illustrates an exemplary representation of an imaging device in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms are used herein. To the extent a term used in a claim is not defined below, it should be given the broadest definition persons in the pertinent art have given that term as reflected in printed publications and issued patents at the time of filing.

Embodiments of the present disclosure provide a lens control apparatus that can be implemented in an imaging device to provide autofocus (AF) and image stabilization (IS) functionalities.

According to an aspect, the lens control apparatus includes a casing, a lens carrier movable in said casing and configured to hold an imaging lens, a pair of focusing coils disposed within said casing and configured to enable linear motion of the lens carrier along an optical axis, and a set of actuating coils disposed within said casing and configured to pivot the lens carrier in a first direction relative to the optical axis and a second direction relative to the optical axis, said first direction and said second direction being orthogonal to each other, wherein a pivot point is configured on the optical axis to pivot the lens carrier in the first direction and the second direction about the pivot point, and wherein the lens control apparatus is capable of providing at least three degrees of freedom to the lens carrier.

In an embodiment, the lens control apparatus further includes a pair of magnetic elements having opposite polarities, each magnetic element disposed within the casing on either side of the lens carrier.

In an embodiment, the set of actuating coils include at least two pairs of actuating coils, each actuating coil of a pair of actuating coils mounted on one of diagonally opposite surfaces of the lens carrier.

In an embodiment, each pair of actuating coils is mounted on surface of a focusing coil of the pair of focusing coils, and wherein each focusing coil of the pair of focusing coils is wound concentrically around the lens carrier.

In an embodiment, actuating coils of the pair of actuating coils are electrically coupled with each other and have reverse coil windings with respect to each other.

In an embodiment, focusing coils of the pair of focusing coils are electrically coupled with each other and have reverse coil windings with respect to each other.

In an embodiment, the lens control apparatus further includes a pair of springs, each spring of the pair of springs positioned on either side of the lens carrier and adapted to firmly hold the lens carrier within the casing.

In an embodiment, at least one spring of the pair of springs comprises a plurality of independent spring elements to drive electrical current in any or a combination of the set of actuating coils and the pair of focusing coils.

In an embodiment, configuration of the pivot point on the optical axis is based on ratio of spring constant between each spring of the pair of springs.

In an embodiment, the apparatus is adapted to provide imagery using the imaging lens on a surface of a spherical shaped curved photo-sensor, spherical shape of the curved photo-sensor being symmetrical about the optical axis.

In an embodiment, the pivot point is configured to coincide with radius of curvature of the curved photo-sensor.

In an embodiment, movement of the lens carrier is controlled using a control unit.

In an embodiment, the control unit is operatively coupled with at least one motion sensor.

In an embodiment, the control unit is operatively coupled with at least one position feedback sensor.

Another aspect of the present disclosure pertains to an imaging device that includes a lens control apparatus, wherein said lens control apparatus includes a casing, a lens carrier movable in said casing and configured to hold an imaging lens, a pair of focusing coils disposed within said casing and configured to enable linear motion of the lens carrier along an optical axis, and a set of actuating coils disposed within said casing and configured to pivot the lens carrier in a first direction relative to the optical axis and a second direction relative to the optical axis, said first direction and said second direction being orthogonal to each other, wherein a pivot point is configured on the optical axis to pivot the lens carrier in the first direction and the second direction about the pivot point, and wherein the lens control apparatus is capable of providing at least three degrees of freedom to the lens carrier.

In an embodiment, the imaging device further includes a curved photo-sensor having spherical shape symmetrical about the optical axis.

In an embodiment, the imaging device further includes a control unit configured to control movement of the lens carrier.

Embodiments herein disclose a lens control apparatus that supports three degrees of freedom and provides formation of spherically curved image plane using a spherically curved photo-sensor. Further, the lens control apparatus provides AF and IS functionalities in imaging devices. Those skilled in the art would appreciate that, by implementing suitable controlling techniques, the lens control apparatus of the present disclosure can be enabled to provide a large image stabilization compensation angle without adversely affecting periphery image quality.

FIG. 1 illustrates an exemplary representation of an imaging device in accordance with an embodiment of the present disclosure.

Referring to FIG. 1, an imaging device 100 such as a camera can include an imaging lens 108, a spherically curved photo-sensor 114, a lens control apparatus 102, and a control unit 110. The lens 108 can project an image at a spherically curved image plane that substantially coincides with surface of the photo-sensor 114. The spherical shape of the curved photo-sensor being symmetrical about an optical axis. The lens control apparatus 102 can provide linear motion to the lens 108 along an optical axis for AF. The lens control apparatus 102 can also provide independent tilting motion of the lens 108 in two directions with respect to the optical axis, the two directions being orthogonal to each other. The tilting motion of the lens 108 can be viewed as a pivoting motion around a pivot point, whose location can be manipulated or fine-tuned by implementing suitable controlling techniques to control components of the lens control apparatus 102. Further, the control unit 110 that can be operatively coupled with one or more motion sensors 112 to execute real-time controlling of various components of the lens control apparatus 102 in a synchronized and coordinated fashion.

Figure 2:
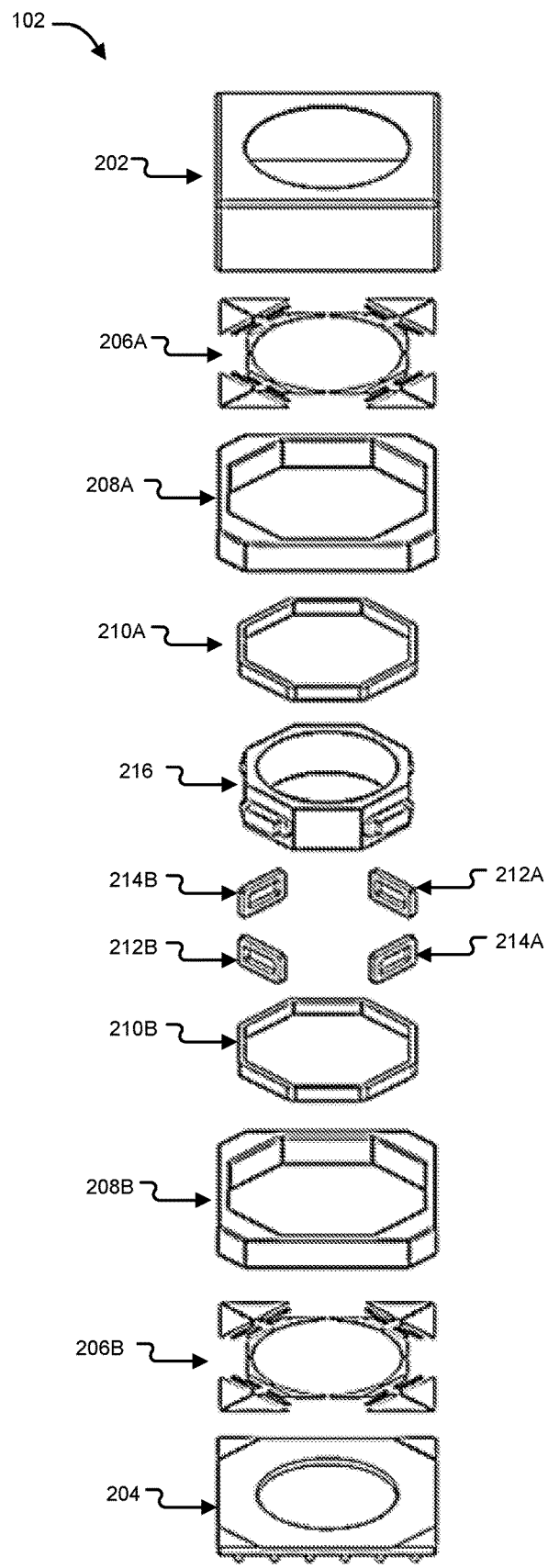
FIG. 2 illustrates an exemplary exploded view of a lens control apparatus in accordance with an embodiment of the present disclosure.

FIG. 2 illustrates an exemplary exploded view of a lens control apparatus in accordance with an embodiment of the present disclosure.

As illustrated, the lens control apparatus 102 can include a casing 202 with a bottom cover 204, a lens carrier 216, a set of actuating coils 212A, 212B, 214A, and 214B, a pair of focusing coils 210A and 210B, a pair of magnetic elements 208A and 208B, and a pair of springs 206A and 206B.

In an embodiment, working components of the lens control apparatus 102 that can be substantially disposed within a housing formed by the casing 202 with the bottom cover 204. The lens carrier 216 can be disposed in the casing 202 to hold the imaging lens 108. AF actuators including the pair of focusing coils 210A and 210B can enable linear movement of the lens carrier 216 along an optical axis. Further, a set of IS actuators including a set of actuating coils 212 A, 212 B, 214A, and 214B can enable tilting movement of the lens carrier 216 in two directions with respect to the optical axis, the two directions being orthogonal to each other. Thus, the lens control apparatus 102 of the present disclosure is capable of providing at least three degrees of freedom to the lens carrier 216.

The lens control apparatus 102 can be viewed as an actuator/motor with the lens carrier 216 as the movable part and casing 202 with bottom cover 204 as the stationary part. Springs 206A and 206B can be deployed to connect the lens carrier 216 with the casing 202 in order to facilitate motion of the lens carrier 216 in the casing 202. In an example, springs 206A and 206B can be sheet metal springs such that each spring is positioned on either side of the lens carrier 216 and adapted to firmly hold the lens carrier 216 with a top surface of the casing 202 and the bottom cover 204.

In an embodiment, a set of actuating coils 212 A, 212 B, 214A, and 214B can include two pairs of actuating coils, a first pair formed by actuating coils 212 A and 212 B, and a second pair formed by actuating coils 214A and 214B. The focusing coils 210A and 210B can be wound concentrically around the lens carrier 216. Further, the first pair of actuating coils 212 A and 212 B can be mounted on surface of the focusing coil 210A and the second pair of the actuating coils 214A and 214B can be mounted on the surface of the focusing coil 210B. Further, each actuating coil of a pair of actuating coils can be mounted on one of diagonally opposite surfaces of the lens carrier 216, for example, actuating coils 212A and 212B can be mounted on diagonally opposite surfaces of the lens carrier 216 and actuating coils 214A and 214B can be mounted diagonally opposite surfaces of the lens carrier 216. The winding patterns of the focusing coils 210A and 210B and actuating coils 212A, 212B, 214A, and 214B is further explained in detail with reference to FIGS. 4A and 4B.

In an embodiment, a pair of magnetic elements 208A and 208B having opposite polarities can be disposed in the casing 202 with each magnetic element being disposed on either side of the lens carrier 216. The magnetic elements 208A and 208B can have same physical dimensions and can be fixed to the casing 202 to form stationary part of the lens control apparatus 102. The magnetic element 208A can be a single piece of magnet that can be configured with to surface of the casing 202 and the magnetic element 208B can be another piece of magnet with reverse magnetic polarity than magnetic element 208 can be configured with the bottom cover 204. Those skilled in the art would appreciate that, owing to reverse polarities, magnetic elements 208A and 208B tend to securely attach with other and can interact with focusing coils 210A and 210B and actuating coils 212A, 212B, 214A and 214B to realize both AF and IS functionalities.

Figure 3A:
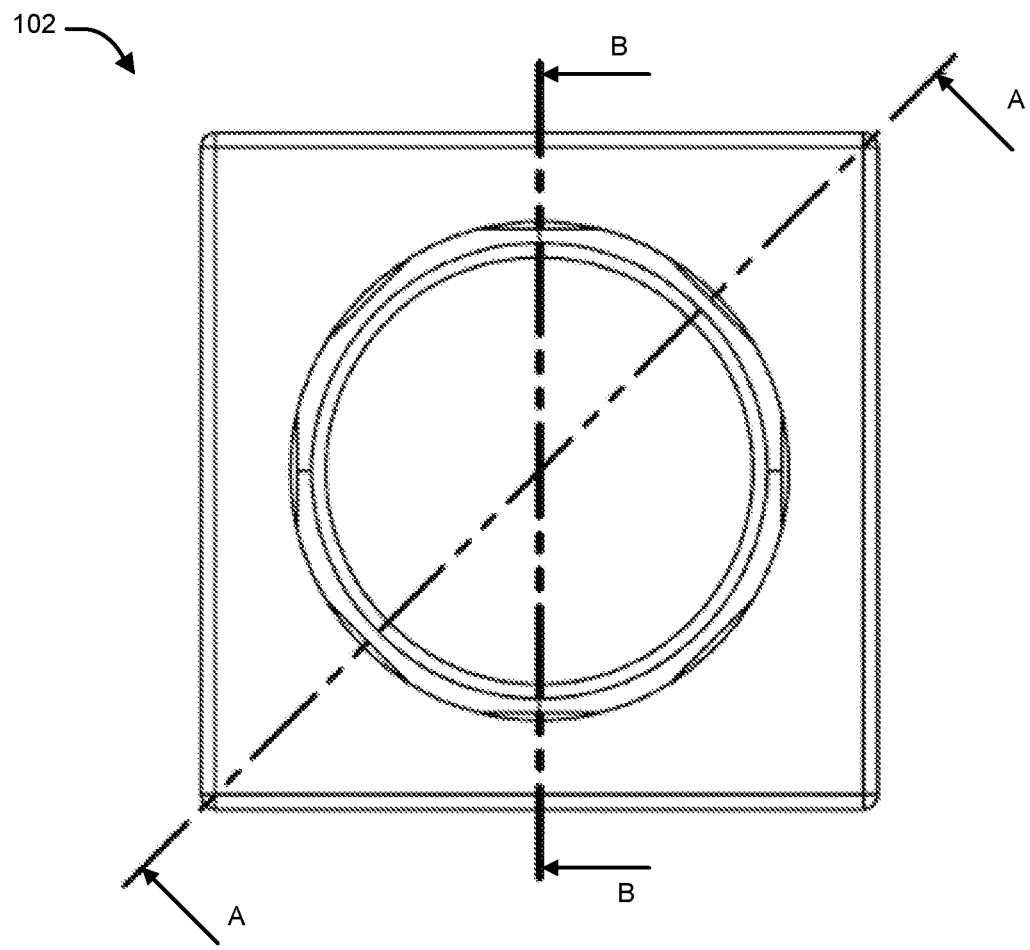
FIGS. 3A-C illustrate exemplary perspective views of the lens control apparatus in accordance with an embodiment of the present disclosure.
Figure 3B:
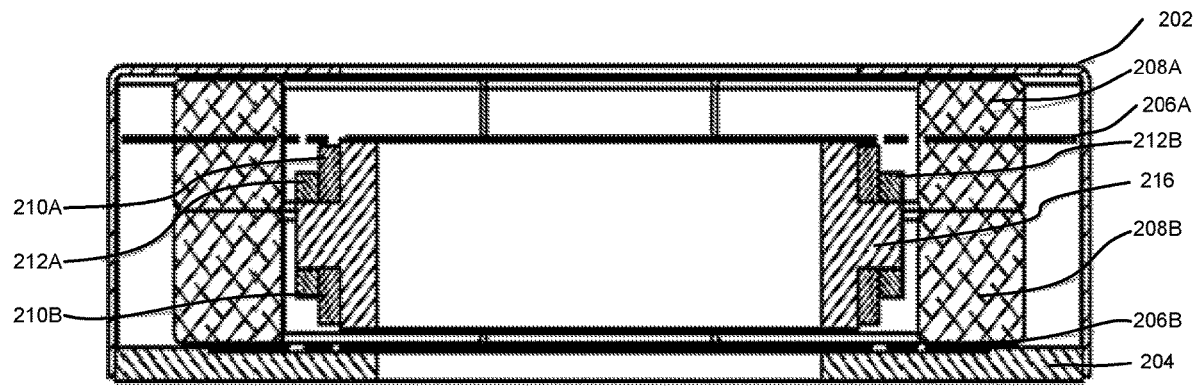
Figure 3C:
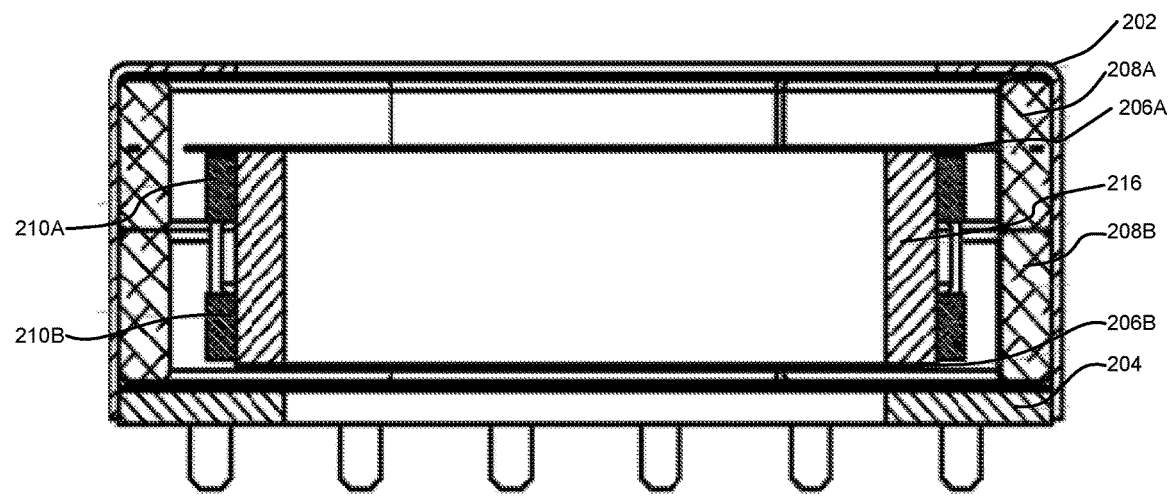

FIGS. 3A-C illustrate exemplary perspective views of the lens control apparatus in accordance with an embodiment of the present disclosure.

FIG. 3A is top view of the lens control apparatus 102, FIG. 3B is a cross sectional view along a line A-A of FIG. 3A, and FIG. 3C is a cross sectional view along a line B-B of FIG. 3A. Referring now to FIG. 3A-C. The casing 202 houses working components of the lens control apparatus 102. The focusing coils 210A and 210B can be wound concentrically around the lens carrier 216. Further, as illustrated in FIG. 3B, the first pair of actuating coils 212 A and 212 B can be mounted on surface of the focusing coil 210A and the second pair of the actuating coils 214A and 214B can be mounted on the surface of the focusing coil 210B. Also, actuating coils 212A and 212B can be mounted on diagonally opposite surfaces of the lens carrier 216 and actuating coils 214A and 214B can be mounted diagonally opposite surfaces of the lens carrier 216.

Those skilled in the art would appreciate that overlapping of the pair of actuating coils 212A and 212B with focusing coil 210A and the pair of actuating coils 214A and 214B with focusing coil 210B enables to achieve compact design of the apparatus by saving length of the lens control apparatus 102. Thus, said overlapping is a critical aspect in achieving an ultra-low profile lens control apparatus 102.

Figure 4A:
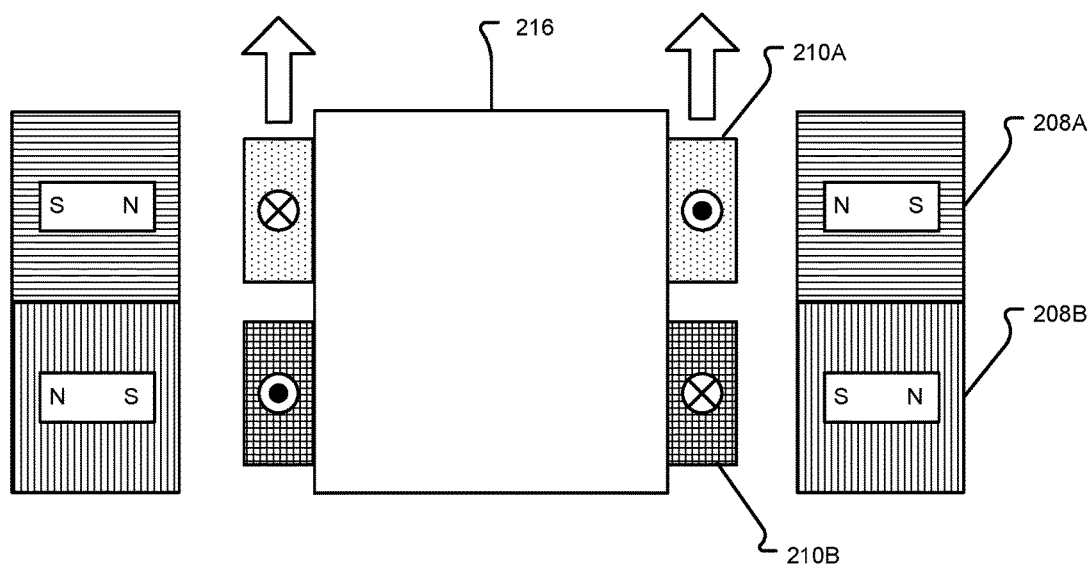
FIGS. 4A-B illustrate exemplary representation of generation of forces in accordance with an embodiment of the present disclosure.
Figure 4B:
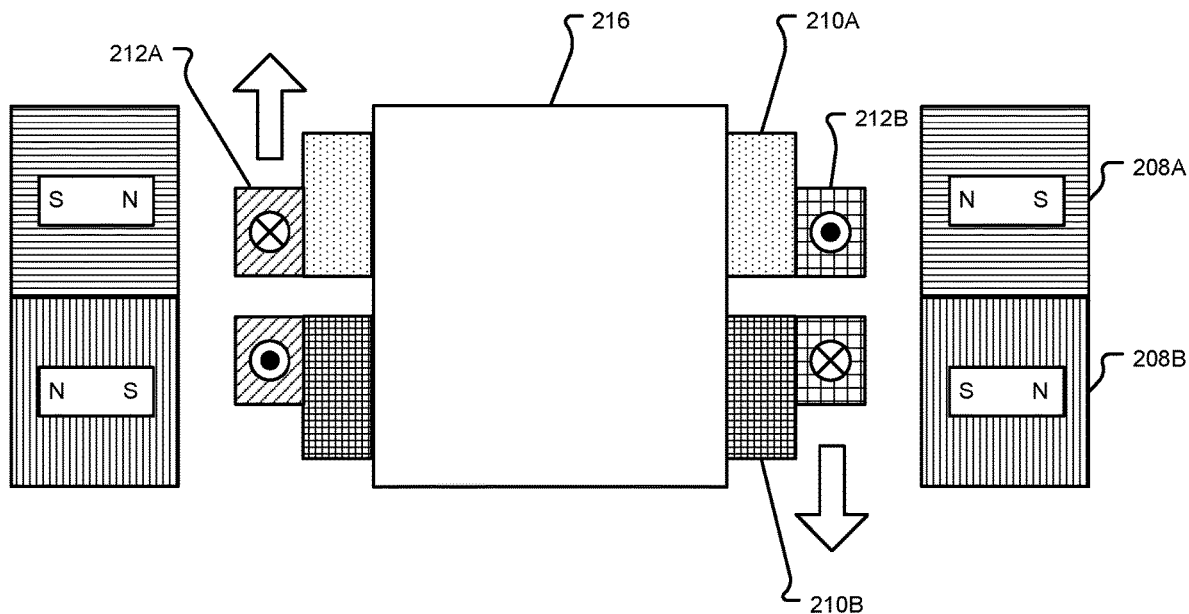

FIGS. 4A-B illustrate exemplary representation of generation of forces in accordance with an embodiment of the present disclosure.

Referring to FIGS. 4A-B, according to an embodiment, focusing coils 210A and 210B can be wound in a concentric fashion around the lens carrier 216. The direction of the coil winding for focusing coil 210A can be opposite to the direction of coil winding for focusing coil 210B. Thus, if focusing coil 210A has a clockwise winding pattern then focusing coil 210B would have a counter-clockwise winding pattern and vice versa. Additionally, one end of the focusing coil 210A can be electrically coupled to one end of the other focusing coil 210B. Thus, focusing coils 210A and 210B can be connected in series to form a single electrical circuit.

In an embodiment, the actuating coils 212A and 212B, which form a pair can be placed on diagonally opposite surfaces of the lens carrier 216 and can be configured in a first direction. Further, coil winding of actuating coil 212A is the reverse of coil winging of actuating coil 212B. Thus, if actuating coil 212A has clockwise wire winding then actuating coil 212B would have counter-clockwise wire winding and vice versa. Also, one end of the actuating coil 212A can be electrically coupled to one end of the actuating coil 212B such that actuating coil 212A and 212B together form a single electrical circuit. Additionally, other pair of actuating coils 214A and 214B can have similar configuration in a second direction.

FIG. 4A illustrates generation of magnetic force to enable AF functionality. According to an embodiment, when focusing coil 210A can be activated with current, the focusing coil 210A can interact with magnetic element 208A to generate a first force in one direction (upward direction) along the optical axis. As focusing coils 210A and 210B are connected in series electrically, the current through the focusing coil 210B would be same as current through the focusing coil 210A. Thus, focusing coil 210B would interact with magnetic element 208B to generate a second force having same magnitude and direction as that of the first force. Thus, the lens carrier 216 would experience a resultant force in the direction along the optical axis. Those skilled in the art would appreciate that if direction of current is reversed, the net resultant force would be generated in a direction (downward direction) opposite to the direction along the optical axis. Thus, the direction of the force generated by focusing coils 210A and 210B would always be identical and along or opposite to the direction along the optical axis.

FIG. 4B illustrates generation of magnetic force to enable IS functionality. According to an embodiment, when the set of actuating coils 212A and 212B are activated with current, the actuating coil 212A would interact with the magnetic element 208A such that a first force is generated in the direction (upward direction) along the optical axis. As actuating coils 212A and 212B are connected in series electrically, the current through actuating coil 212B would be same as the current through actuating coil 212A. The current through actuating coil 212B would interact with the magnetic element 208B to generate a second force of same magnitude as that of the first force and in a direction (downward direction) opposite to the direction along the optical axis. Thus, the lens carrier 216 would experience zero resultant force; however, a torque would be generated in a first direction relative to the optical axis. Those skilled in the art would appreciate that, actuating coils 214A and 214B can generate a torque on the lens carrier 216 in a second direction relative to the optical axis.

Figure 5:
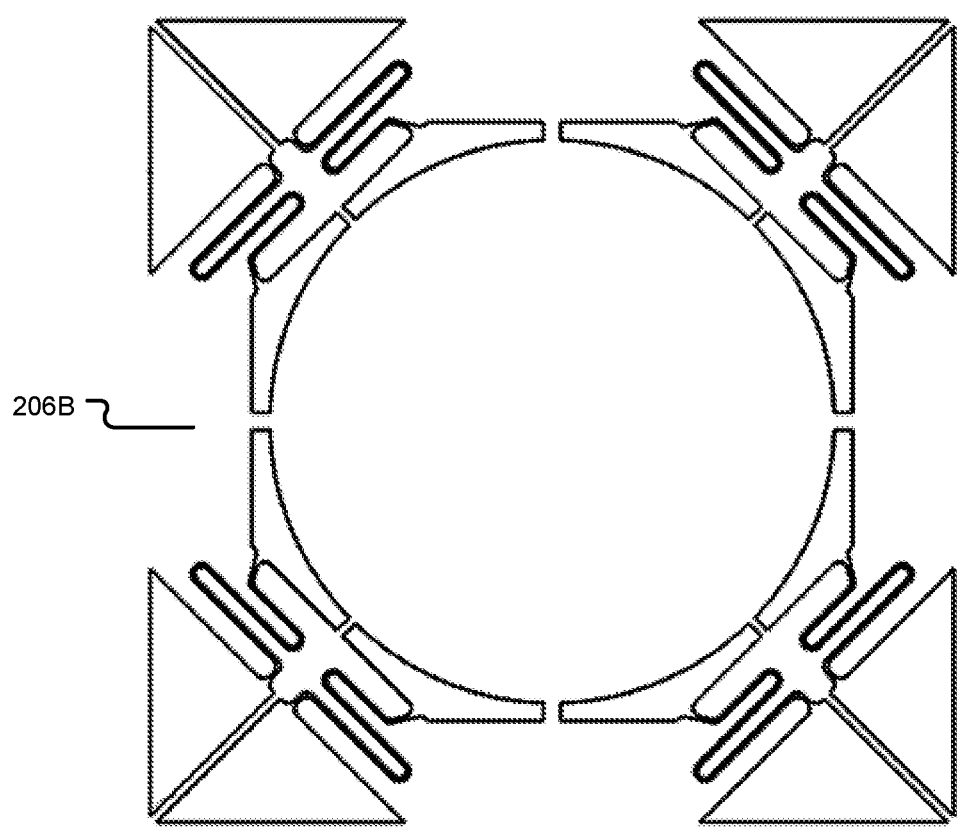
FIG. 5 illustrates exemplary representation of a spring of the lens control apparatus in accordance with an embodiment of the present disclosure.

FIG. 5 illustrates exemplary representation of a spring of the lens control apparatus in accordance with an embodiment of the present disclosure.

As elaborated above, the lens control apparatus 102 includes springs 206A and 206B, each spring can be positioned between the casing 202 and either side of the lens carrier 216 to facilitate the movement of the lens carrier 216. In an embodiment, one end of the spring 206A can be fixed to the interior wall of the casing 202 and the other end of the spring 206A can be fixed to a surface of the lens carrier 216. The fixing of the springs can be achieved by using adhesive substances or using laser welding process. Further, one end of the spring 206B can be fixed to the surface of the bottom cover 204, and other end of the spring 206B can be fixed to other surface of the lens carrier 216.

Those skilled in the art would appreciate that the spring 206B can also be used as electrical conductors to direct electrical current through focusing coils 210A and 210B and actuating coils 212A, 212B, 214A and 214B. Hence, the spring 206B can include plurality of independent springs for driving electrical current through focusing coils 210A and 210B and actuating coils 212A, 212B, 214A and 214B. Thus, the number of independent springs can be equal to or greater than the number of ends of focusing coils 210A and 210B and actuating coils 212A, 212B, 214A and 214B.

Figure 6:
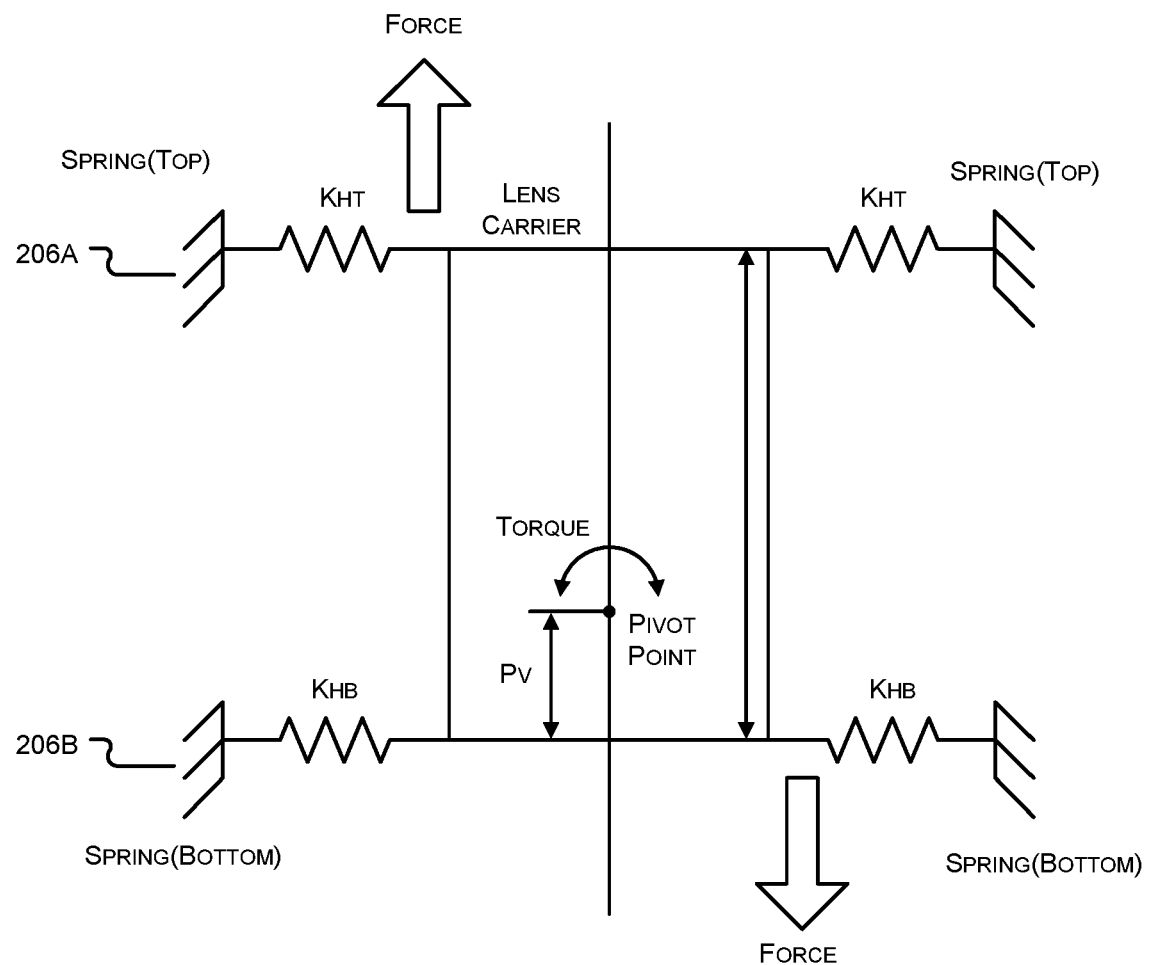
FIG. 6 illustrates configuration of a pivot point in accordance with an embodiment of the present disclosure.

FIG. 6 illustrates configuration of a pivot point in accordance with an embodiment of the present disclosure.

According to an embodiment, the two pairs of actuating coils 212A and 212B, and 214A and 214B can generate torque to pivot the lens carrier 216 along a first direction and a second direction, the first direction and the second direction being orthogonal with each other. The pivoting motion would be around a pivot point along the optical axis. Further, the pivot point can be located somewhere between the two planes formed by the spring 206A and the springs 206B respectively. The location of the point can be manipulated (i.e., moving along the optical axis) by adjusting spring constants of the spring 206A and the spring 206B.

The spring constant of a system formed by spring 206A and 206B can be decoupled into two directions, Kv and Kh where Kv is the effective spring constant along the optical axis direction and Kh is the spring constant in a direction orthogonal to the direction of the optical axis. Kv can be resultant of the Kv constants of the spring 206A and the spring 206B. In an example, it can be considered that Kvt and Kvb denote the spring constant of the spring 206A and the spring 206B respectively along the optical axis direction, thus, the effective Kv of the system would be the sum of Kvt and Kvb. Similarly, it can be considered that Kht and Khb denote the spring constant of the spring 206A and the spring 206B respectively along the direction orthogonal to the direction of the optical axis, thus, the effective Kh of the system would be the sum of Kht and Khb.

In an embodiment, the exact location of the pivot point along the optical axis can be based on the ratio of the Kht and Khb. Assuming, Pv denotes position of the pivot point measured from the spring plane of spring 206B, then Pv equals to S*Kht/Khb where S is the distance between the spring 206A and spring 206B. Thus, by configuring spring constants Kht and Khb of the springs 206A and 206B, the location of the pivot point can be optimized.

Figure 7:
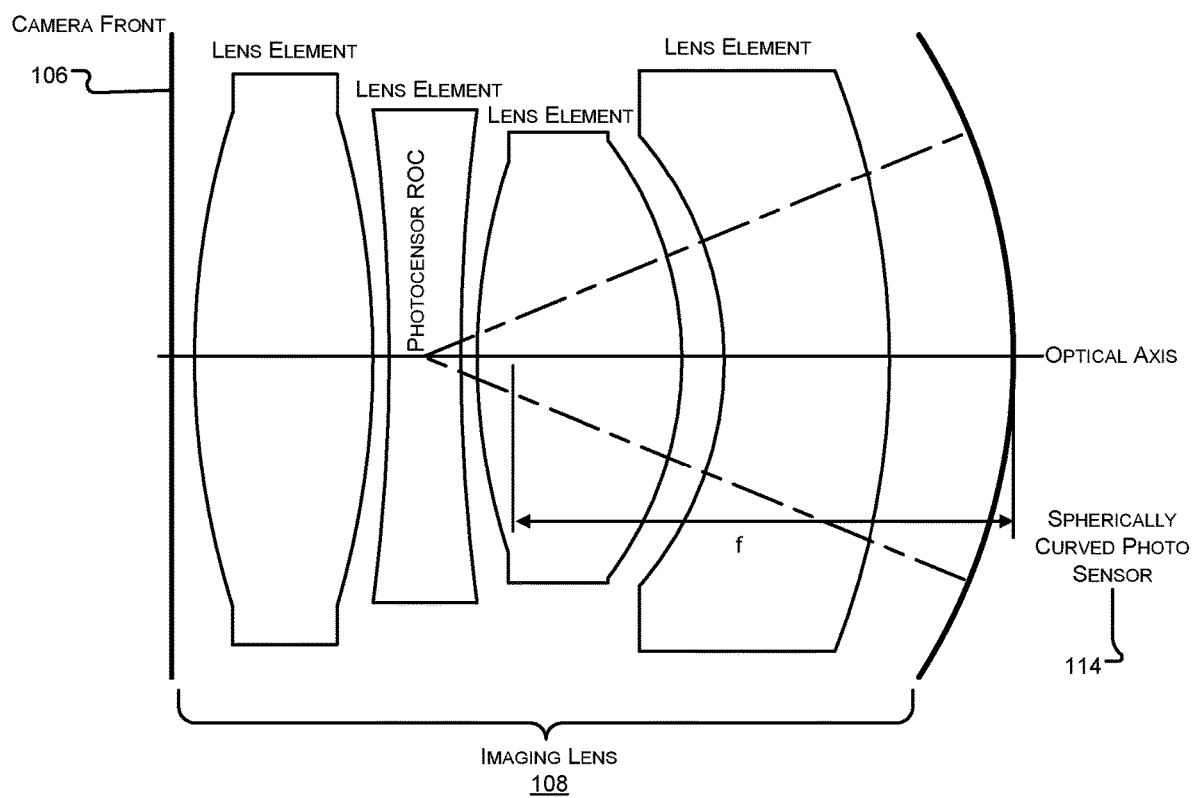
FIG. 7 illustrates exemplary representation of configuration of an imaging lens and a curved photo-sensor in accordance with an embodiment of the present disclosure.

FIG. 7 illustrates exemplary representation of configuration of an imaging lens and a curved photo-sensor in accordance with an embodiment of the present disclosure.

Referring to FIG. 7, the imaging lens 108 can include one or more lens elements to project an image on an imaging plane that can substantially coincide with surface of the spherically curved photo-sensor 114. In order to form a spherically curved image plane at or near the surface of photo-sensor 114, the radius of curvature (RoC) of the photo-sensor 114 can be close to effective focal length f of the imaging lens 108.

According to an embodiment, the control unit 110 can be utilized for running a real-time control algorithm to control each of the motion actuator in a coordinated fashion to realize the autofocus and tilting motion of the lens carrier 216. The control unit 110 can be a dedicated standalone controller or integrated into a more general purpose processor.

To implement IS functionality, the lens 108 can be actuated inside the lens control apparatus 102 to offset any external vibrations. Thus, a relative movement between the lens 108 and the curved photo-sensor 114 is created. Further, amount of tilting experienced by the lens carrier 216 can be precisely controlled to offset any external vibration (such as from handshaking) that can be detected by one or more motion sensors 112 such as accelerometers and/or gyroscopes operatively coupled with the control unit 110.

FIGS. 8A-D illustrate configuration of depth of focus region in accordance with an embodiment of the present disclosure.

Figure 8A:
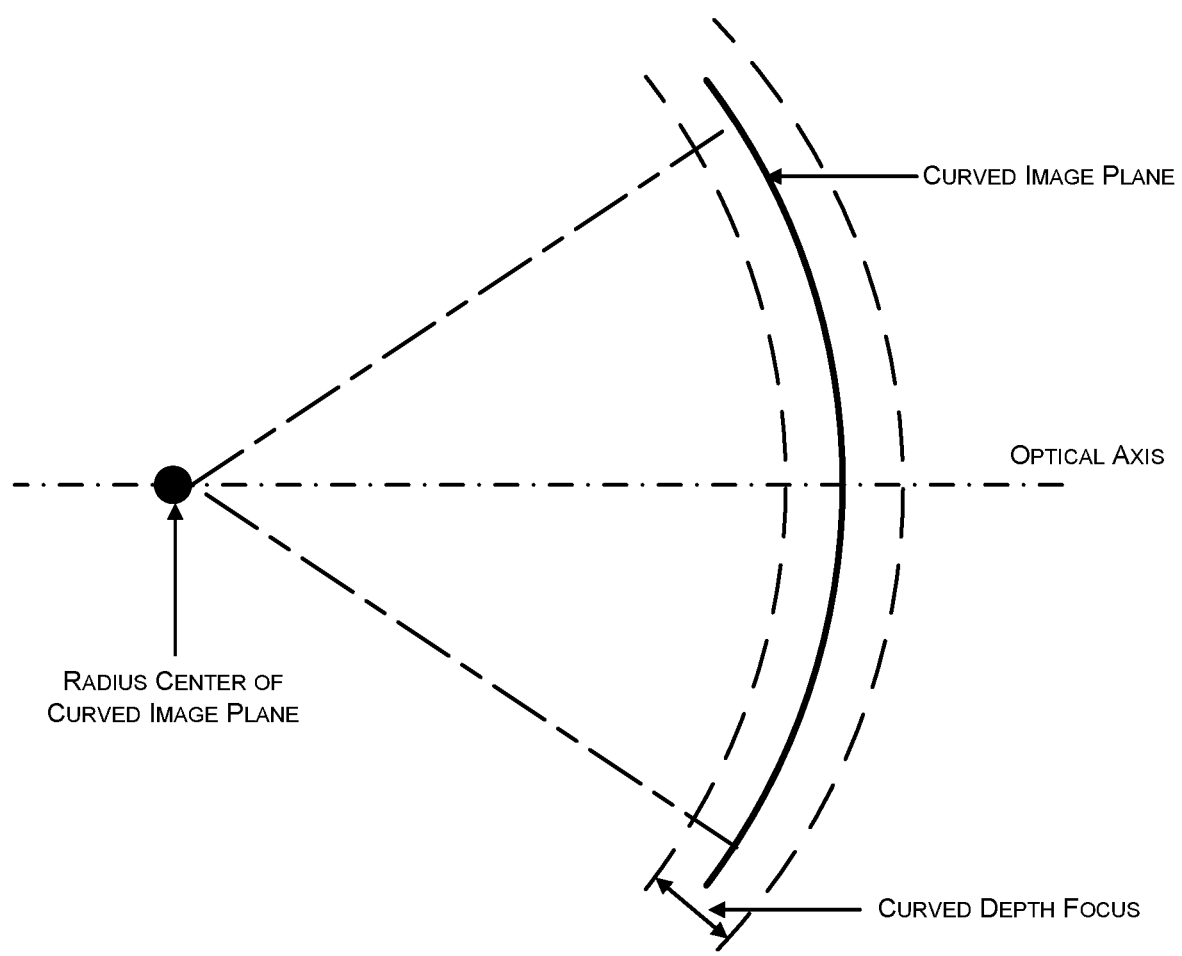
FIGS. 8A-D illustrate configuration of depth of focus region in accordance with an embodiment of the present disclosure.

FIG. 8A illustrates a depth of focus region taken by a curved photo-sensor 114. It would be appreciated that, as IS involves movement of the lens 108 along the optical axis, the depth of focus region of the lens 108 would also move along with the movement of the lens 108. The depth of focus of the lens 108 can be defined as tolerance of the placement of the imaging plane relative to the lens 108.

Figure 8B:
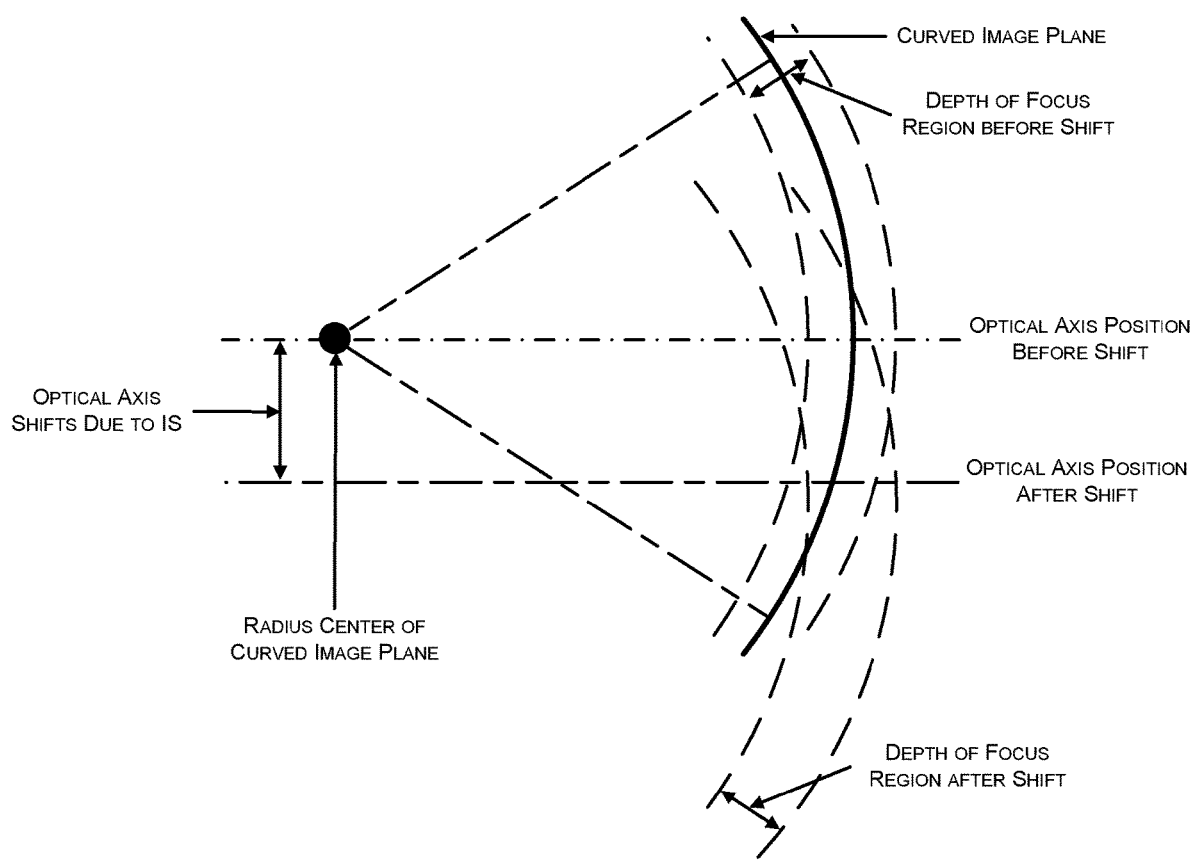

FIG. 8B illustrates shifting of depth of focus region due to lateral shift in the optical axis. It would be appreciated that, if image sensing area is outside of the depth of focus region, the clarity of the image suffers. It is known in the art that during IS, through introduction of the movement of lens 108 relative to the photo-sensor 114, occasionally there can be reduction in image clarity near periphery of the photo-sensor 114 when a part of the photo-sensor 114 is outside of the depth of focus region. Also, to implement IS, certain devices actuates the lens 108 laterally in lateral directions perpendicular to the optical axis. For example, in an existing lens shift-based IS technique, the lens shifts laterally in the X and Y direction orthogonal to the optical axis. Due to lateral shift in the lens, the depth of focus region shifts laterally as well. Thus, in periphery of the curved photo sensor, the depth of focus region may shift out of the curved image surface resulting in blurry image at the periphery. Therefore, it would be appreciated that the tilting techniques for implementation of IS as disclosed in the present disclosure are advantageous over the techniques that pertain to shifting of lens in lateral directions orthogonal to the optical axis for IS.

Figure 8C:
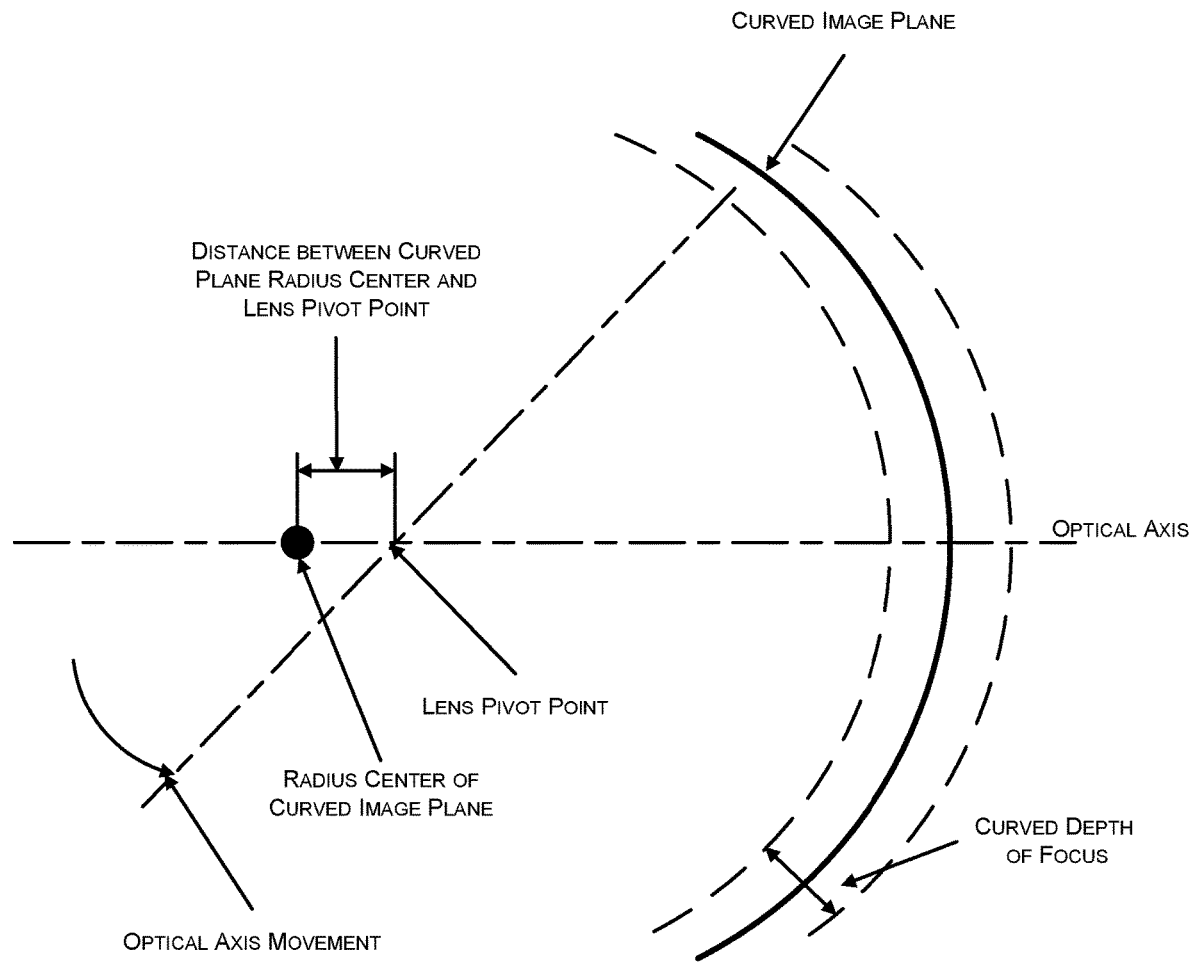

FIG. 8C illustrates moving of depth of focus region around the pivot point. According to an embodiment, to guarantee optimal picture quality when the lens 108 is actuated away from normal of the curved photo-sensor 114, tilting of the lens 108 is carefully controlled to match the curvature of the curved photo-sensor 114. In an implementation, the lens control apparatus 102 controls the lens 108 for AF and IS. The location of the pivot point of the lens carrier 216 can be closely matched with radius of curvature (RoC) of the curved photo-sensor 114. When the depth of focus region moves around the pivot point, it would have a greater chance to leave the surface of the curved photo-sensor 114 within the depth of focus region. Thus, the surface of the curved photo-sensor 114 can remain to be inside the depth of focus region defined by the lens 108 even when the lens 108 is pivoting because of IS. Thus, IS can be realized without significant loss of picture clarity especially near the periphery of the image.

Figure 8D:
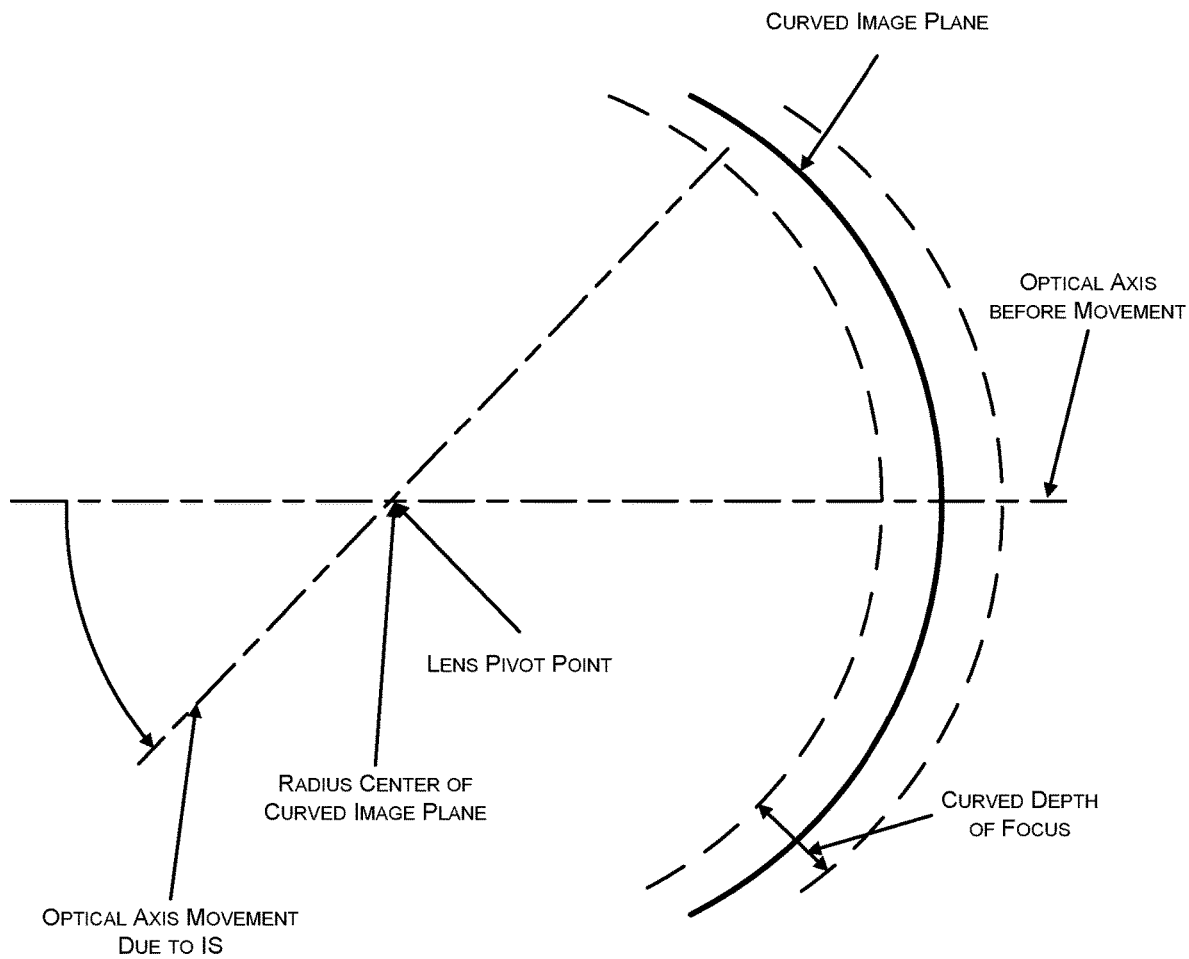

FIG. 8D illustrates an ideal case where the pivot point coincides with the RoC such that the surface of the curved photo-sensor can remain perfectly inside the depth of focus region. In an ideal case the pivot point of the lens carrier 216 can be designed to coincide with the RoC, the image sensing surface can remain to be within the depth of focus of the lens even when the lens 108 pivots further away from the optical axis. It would be appreciated that in said ideal case the surface of the curved photo-sensor 114 would coincide with depth of focus region even when tilting angle is large.

Figure 9:
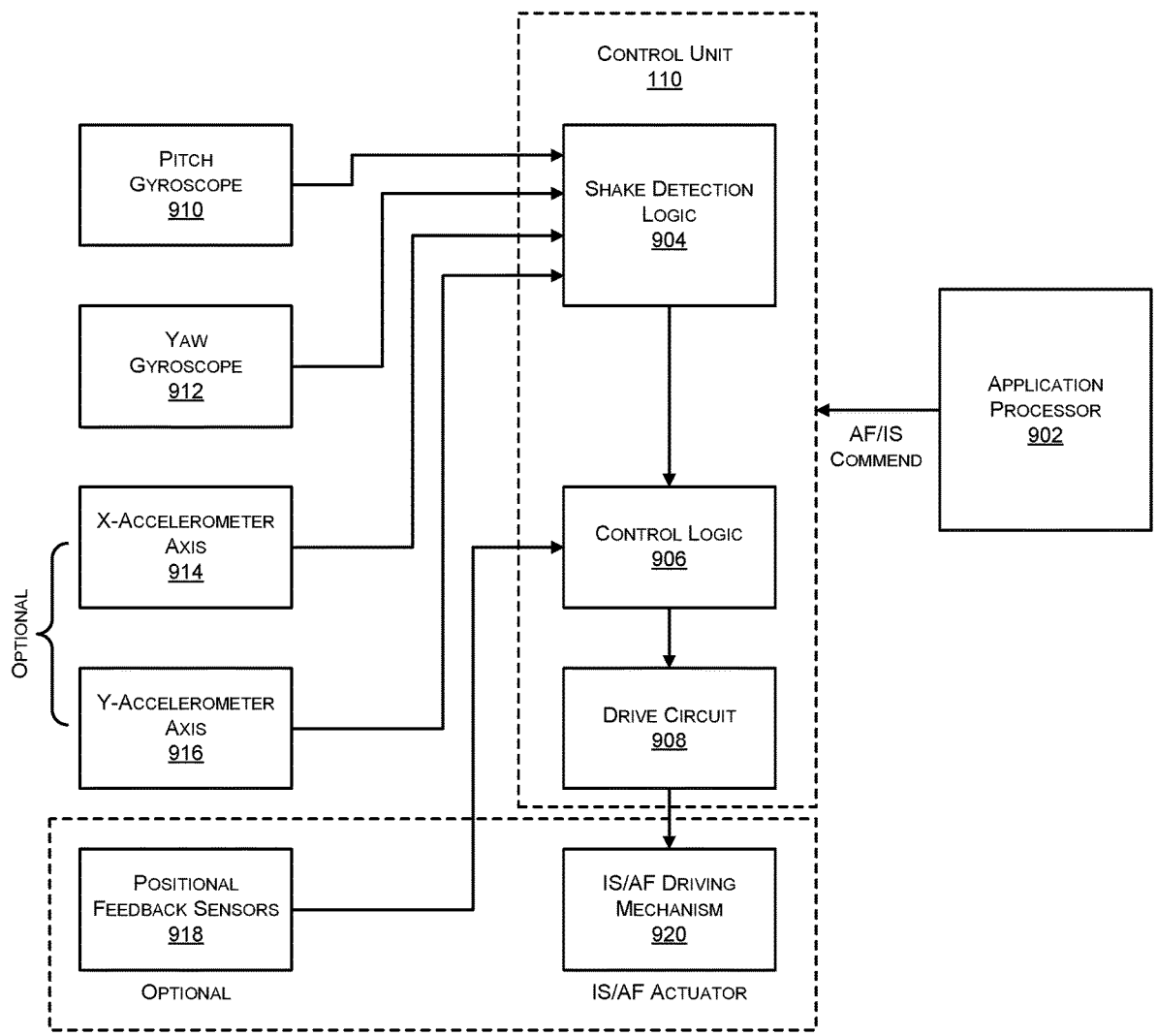
FIG. 9 illustrates a block diagram for control unit in accordance with an embodiment of the present disclosure.

FIG. 9 illustrates a block diagram for control unit in accordance with an embodiment of the present disclosure.

According to an embodiment, the control unit 110 can execute the AF and/or IS real-time control algorithm. The control unit 110 can be operatively coupled with one or more motion sensors 112. According to an embodiment, the present invention can allow 2 to 4 axes IS depending on the number of motion sensors 112. If 2 axes gyroscopes i.e. pitch gyroscope 910 and yaw gyroscope 912 are configured, the vibration of the imaging device 100 in both pitch and yaw angle can be IS compensated. If 2 axes of lateral accelerometers i.e. X-Accelerometer 914 and Y accelerometer 916 are configured, the vibration of the imaging device 100 in the lateral X and Y directions can also be IS compensated. The gyroscopes and/or accelerometers can provide input to the shake detection logic 904 of the control unit 110. Further, the control unit 110 can also be operatively configured with one or more position feedback sensors 918 such as Hall sensors that can provide positional feedback information of the lens 108 to control logic 906 of the control unit 110. Further, an application processor (AP) 902 can be operatively coupled with the control unit 110 and can act as a host to communicate housekeeping tasks as well as sending AF commands when focusing is required. The control unit 110 can include a drive circuit 908 to provide driving commands to driving mechanism 920 of the AF/IS actuators. Though embodiments of the present disclosure are explained to perform controlling using a control unit 110, however, the scope of the present disclosure is not limited in any way to the use of control unit 110 for example, the disclosure does not preclude the computational task of the control unit 110 being executed on the Application Processor 902 thus, a need to have a dedicated control unit 110 can be eliminated, thereby, reducing number of components that are required to perform controlling of the lens control apparatus 102.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

We claim:

1. A lens control apparatus comprising:
   a casing;
   a lens carrier movable in said casing and configured to hold an imaging lens;
   a pair of focusing coils disposed within said casing and configured to enable linear motion of the lens carrier along an optical axis; and
   a set of actuating coils disposed within said casing and configured to pivot the lens carrier in a first direction relative to the optical axis and a second direction relative to the optical axis, said first direction and said second direction being orthogonal to each other, wherein a pivot point is configured on the optical axis to pivot the lens carrier in the first direction and the second direction about the pivot point, and
   wherein the lens control apparatus is capable of providing at least three degrees of freedom to the lens carrier;
   wherein the set of actuating coils comprise at least two pairs of actuating coils, each actuating coil of a pair of actuating coils mounted on one of diagonally opposite surfaces of the lens carrier;
   wherein each pair of actuating coils is mounted on a surface of a focusing coil of the pair of focusing coils, and wherein each focusing coil of the pair of focusing coils are wound concentrically around the lens carrier.

2. The lens control apparatus of claim 1, further comprising a pair of magnetic elements having opposite polarities, each magnetic element disposed within the casing on either side of the lens carrier.

3. The lens control apparatus of claim 1, wherein actuating coils of the pair of actuating coils are electrically coupled with each other and have reverse coil windings with respect to each other.

4. The lens control apparatus of claim 1, wherein focusing coils of the pair of focusing coils are electrically coupled with each other and have reverse coil windings with respect to each other.

5. The lens control apparatus of claim 1, further comprising a pair of springs, each spring of the pair of springs positioned on either side of the lens carrier and adapted to firmly hold the lens carrier within the casing.

6. The lens control apparatus of claim 5, wherein at least one spring of the pair of springs comprises a plurality of independent spring elements to drive electrical current in any or a combination of the set of actuating coils and the pair of focusing coils.

7. The lens control apparatus of claim 5, configuration of the pivot point on the optical axis is based on ratio of spring constant between each spring of the pair of springs.

8. The lens control apparatus of claim 1, wherein said apparatus is adapted to provide imagery using the imaging lens on a surface of a spherical shaped curved photo-sensor, spherical shape of the curved photo-sensor being symmetrical about the optical axis.

9. The lens control apparatus of claim 8, wherein the pivot point is configured to coincide with radius of curvature of the curved photo-sensor.

10. The lens control apparatus of claim 1, wherein movement of the lens carrier is controlled using a control unit.

11. The lens control apparatus of claim 10, wherein the control unit is operatively coupled with at least one motion sensor.

12. The lens control apparatus of claim 10, wherein the control unit is operatively coupled with at least one position feedback sensor.

13. An imaging device comprising a lens control apparatus, wherein said lens control apparatus comprises:
    a casing;
    a lens carrier movable in said casing and configured to hold an imaging lens;
    a pair of focusing coils disposed within said casing and configured to enable linear motion of the lens carrier along an optical axis; and
    a set of actuating coils disposed within said casing and configured to pivot the lens carrier in a first direction relative to the optical axis and a second direction relative to the optical axis, said first direction and said second direction being orthogonal to each other, wherein a pivot point is configured on the optical axis to pivot the lens carrier in the first direction and the second direction about the pivot point, and
    wherein the lens control apparatus is capable of providing at least three degrees of freedom to the lens carrier;
    wherein the set of actuating coils comprise at least two pairs of actuating coils, each actuating coil of a pair of actuating coils mounted on one of diagonally opposite surfaces of the lens carrier;
    wherein each pair of actuating coils is mounted on a surface of a focusing coil of the pair of focusing coils, and wherein each focusing coil of the pair of focusing coils are wound concentrically around the lens carrier.

14. The imaging device of claim 13, further comprising a curved photo-sensor having spherical shape symmetrical about the optical axis.

15. The imaging device of claim 13, further comprising a control unit configured to control movement of the lens carrier.

16. The imaging device of claim 13, wherein the control unit is operatively coupled with at least one motion sensor.

17. The imaging device of claim 13, wherein the lens control apparatus further comprises a pair of springs, each spring of the pair of springs positioned on either side of the lens carrier and adapted to firmly hold the lens carrier within the casing.

18. The imaging device of claim 17, wherein configuration of the pivot point on the optical axis is based on ratio of spring constant between each spring of the pair of springs.

* * * * *